(12) United States Patent
Koryakin et al.

(10) Patent No.: US 7,856,542 B1
(45) Date of Patent: *Dec. 21, 2010

(54) PAGING CACHE OPTIMIZATION FOR VIRTUAL MACHINE

(75) Inventors: Alexey B. Koryakin, Moscow (RU); Mikhail A. Ershov, Moscow (RU); Nikolay N. Dobrovolskiy, Moscow (RU); Andrey A. Omelyanchuk, Moscow (RU); Alexander G. Tormasov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,556

(22) Filed: Sep. 15, 2009

Related U.S. Application Data

(63) Continuation of application No. 11/671,551, filed on Feb. 6, 2007, now Pat. No. 7,596,677.

(51) Int. Cl.
*G06F 12/08* (2006.01)
*G06F 12/10* (2006.01)

(52) U.S. Cl. .................... 711/206; 711/208; 711/6; 711/E12.059

(58) Field of Classification Search .............. None
See application file for complete search history.

(56) References Cited

U.S. PATENT DOCUMENTS

| 4,300,192 A | 11/1981 | Couleur et al. |
| 5,764,999 A | 6/1998 | Wilcox et al. |
| 6,785,886 B1 | 8/2004 | Lim et al. |
| 2003/0126442 A1 | 7/2003 | Glew et al. |
| 2006/0004944 A1 | 1/2006 | Vij et al. |
| 2006/0026384 A1 | 2/2006 | Brandt et al. |

*Primary Examiner*—Reginald G Bragdon
*Assistant Examiner*—Daniel J Bernard
(74) *Attorney, Agent, or Firm*—Bardmesser Law Group

(57) ABSTRACT

A system, method and computer program product for virtualizing a processor include a virtualization system running on a computer system and controlling memory paging through hardware support for maintaining real paging structures. A Virtual Machine (VM) is running guest code and has at least one set of guest paging structures that correspond to guest physical pages in guest virtualized linear address space. At least some of the guest paging structures are mapped to the real paging structures. For each guest physical page that is mapped to the real paging structures, paging means for handling a connection structure between the guest physical page and a real physical address of the guest physical page. A cache of connection structures represents cached paths to the real paging structures. Each path is described by guest paging structure descriptors and by tie descriptors. Each path includes a plurality of nodes connected by the tie descriptors. Each guest paging structure descriptor is in a node of at least one path. Each guest paging structure either points to other guest paging structures or to guest physical pages. Each guest paging structure descriptor represents guest paging structure information for mapping guest physical pages to the real paging structures.

19 Claims, 10 Drawing Sheets

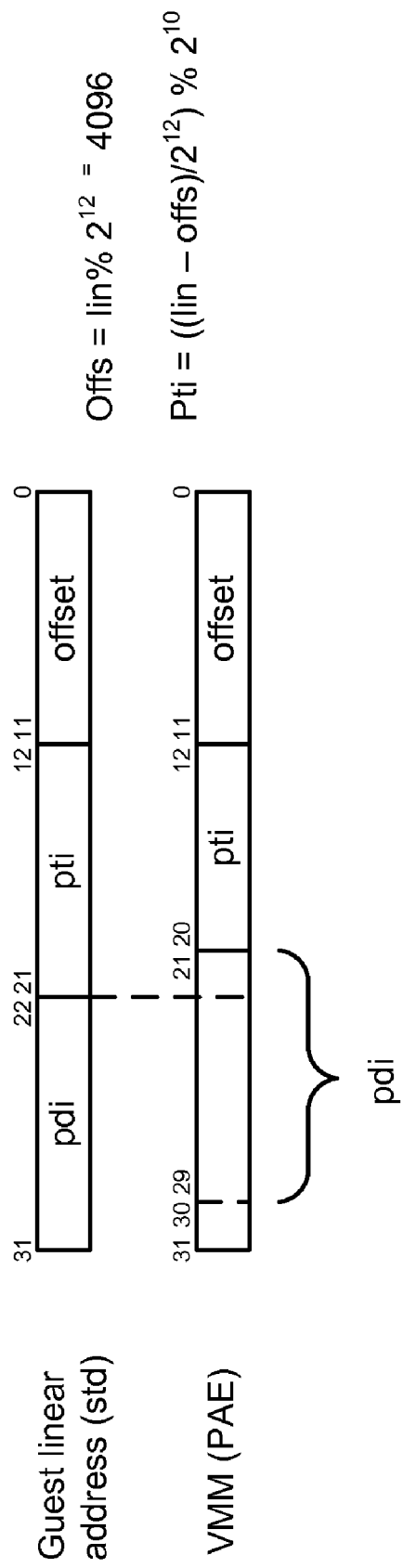

PAGING CACHE OPTIMIZATION FOR VIRTUAL MACHINE

CROSS REFERENCE TO RELATED APPLICATIONS

This application is a continuation of U.S. patent application Ser. No. 11/671,551, filed Feb. 6, 2007, now U.S. Pat. No. 7,596,677, which is incorporated herein by reference in its entirety.

BACKGROUND OF THE INVENTION

1. Field of the Invention

The present invention relates to Virtual Machine technology, and, more particularly, to memory management for Virtual Machines.

2. Background Art

With Virtual Machine (VM) technology, a user can create and run multiple operating environments on a server at the same time. Each operating environment, or Virtual Machine, requires its own operating system (OS) and can run applications independently. The VM software provides a layer between the computing, storage, and networking hardware and the software that runs on it.

Virtual Machine technology can lower information technology (IT) cost through increased efficiency, flexibility, and responsiveness. Each VM acts as a separate environment, which reduces risk and allows developers to quickly re-create different operating system (OS) configurations or compare versions of applications designed for different OS's. Additional uses for VMs include targeted production server consolidation, hosting of legacy applications (older versions), and computer or server backup.

Virtual Machine technology is therefore one technique for emulating or otherwise virtualizing the behavior of software and/or hardware. Generally, a Virtual Machine is an environment that is launched on a particular processor that is running an operating system. Normally, the operating system installed on such a machine or processor has certain privileges that are not available to user applications. For example, many input/output commands may be privileged, and executable only in the operating system (or privileged) mode. Certain areas of memory, or certain addresses in memory, also may require operating system privilege to be accessed.

For each VM, a separate process is created, and the host operating system (HOS) is responsible for scheduling of both the VMs and other processes in the HOS. Examples of such hosted VMMs include VMware GSX Server, VMware Workstation, MS Virtual PC, MS Virtual Server and SVISTA 2004.

Throughout this discussion, it will also be assumed that the reader is generally familiar with the various addressing modes of the Intel processor architecture, as well as with virtualization techniques for the Intel family of processors. Generally, the Intel architecture has a number of relatively complex addressing schemes, all of which can be used by the processor at various times. Furthermore, due to the need to support legacy software, over the years, the Intel architecture has grown increasingly complex, and therefore, increasingly difficult to virtualize. The practical consequence of this is that the performance of the virtualized operating system is frequently significantly slower than the performance of a non-virtualized code. One of the reasons for this involves the paging structures used by the operating system, and the need to virtualize them.

In the context of virtualization, the problem exists in having to efficiently map the paging structures of the guest operating system to the paging structures of the Virtual Machine Monitor. As far as the guest operating system is concerned, this must be entirely transparent, however, the amount of physical memory that the guest operating system "really" has is usually much less than the amount of physical memory that the guest operating system "thinks" it has. This may be due to the fact that some of the memory is allocated to the Virtual Machine Monitor and to the host operating system. It may be due to the fact that several Virtual Machines are running at the same time, and the physical memory therefore needs to be apportioned between them by the host OS and/or VMM. The consequence of this is that very frequently, guest code running in a particular Virtual Machine will attempt to access a page in memory that the Virtual Machine thinks is mapped into linear space, however, in reality, that page is marked as "not present" and therefore absent in paging translation. This triggers a page fault, throwing control to the VMM, which needs to handle the page fault.

The problem of mapping between guest paging structures and VMM paging structures is something that has significant efficiency implications, because it is a relatively overhead-intensive process. Thus, to improve the efficiency of the Virtual Machine, the number of page faults needs to be minimized and the amount of overhead associated with each page fault needs to be minimized as well.

Accordingly, there is a need in the art for an efficient mechanism for handling page faults in the context of Virtual Machine technology.

BRIEF SUMMARY OF THE INVENTION

The present invention is directed to managing page faults for a Virtual Machine that substantially obviates one or more of the problems and disadvantages of the related art.

In one aspect, there is provided a system, method and computer program product for virtualizing a processor include a virtualization system running on a computer system and controlling memory paging through hardware support for maintaining real paging structures. A Virtual Machine (VM) is running guest code and has at least one set of guest paging structures that correspond to guest physical pages in guest virtualized linear address space. At least some of the guest paging structures are mapped to the real paging structures. For each guest physical page that is mapped to the real paging structures, paging means for handling a connection structure between the guest physical page and a real physical address of the guest physical page. A cache of connection structures represents cached paths to the real paging structures. Each path is described by guest paging structure descriptors and by tie descriptors. Each path includes a plurality of nodes connected by the tie descriptors. Each guest paging structure descriptor is in a node of at least one path. Each guest paging structure either points to other guest paging structures or to guest physical pages. Each guest paging structure descriptor represents guest paging structure information for mapping guest physical pages to the real paging structures.

The VMM paging structures comprise a plurality of layers, each layer having at least one table with pointers to the next lower layer. Tie descriptors are associated with at least one of the layers, the tie descriptors (linking structures) including pointers to entries in the VMM paging structures corresponding to mapped guest paging structure entities, and backlink information from the entries to the next-higher level structures.

In one embodiment, the layers include a zeroth layer with pages, a first layer with page tables, and a second layer with page directories. Depending on the addressing mode, there can also be, e.g., third layer with page directory pointer tables, and a fourth layer with PML4 tables. Each layer can have its own set of tie descriptors. The VM can use one of standard, PAE and EM64T (or Long-Mode from AMD, or similar constructs in other processor architectures) addressing modes, and the VMM can use an addressing mode at least as high as the VM addressing mode. The tie descriptors can include pointers to other tie descriptors of the same layer, and/or pointers to paging elements of the next layer below, and/or pointers to paging elements of the layer above. A CR3 cache can also be used, such that entries in the cache are indices to the highest-level paging structure of the VMM.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A, 2B, 2C illustrate the various addressing modes of the Intel architecture, as they pertain to one embodiment of the invention.

DETAILED DESCRIPTION OF THE INVENTION

Figure 1:
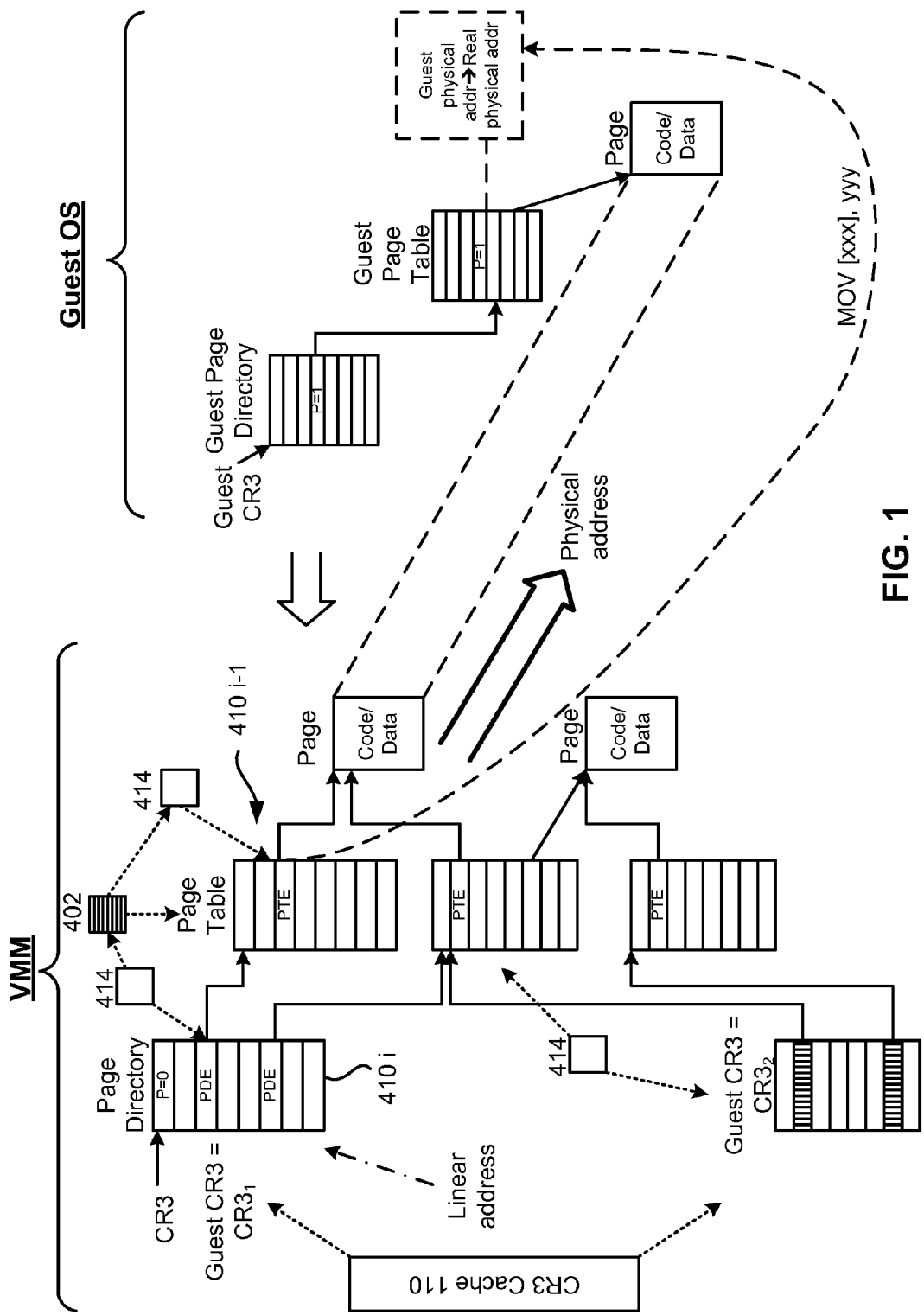
FIG. 1 illustrates the concept of mapping guest paging structures to VMM paging structures.

Reference will now be made in detail to the embodiments of the present invention, examples of which are illustrated in the accompanying drawings.

For purposes of the present discussion, it is assumed that the reader is familiar with Virtual Machines in general and virtualization of operating system and computer resources in particular. Examples of Virtual Machines are commercially available, for example, from Parallels Software International, Inc., the assignee of this application, from VMWare, Inc., and from Microsoft Corporation. This invention is applicable for any kind of virtual machines where a privilege level of virtualization system (Hypervisor, VMM, etc.) is present to maintain real paging structures, and there is guest linear address to guest physical address translation to execute instructions of the guest operating system.

In the Intel architecture, any memory access requires segment translation and future paging translation. To execute an instruction, the CPU uses code segment translation. To access data, CPU uses data segment translation. Any instruction utilizes at least one segment register to address the memory (code segment). For example, in the Intel processor, CS is the code segment register to execute instructions, SS is the stack segment register to storing data in the stack and DS, ES, FS, GS are segment registers for other data access. For example, the processor checks the code segment register (CS) prior to execution of any code. Code (instructions) can be grouped by different code segments, and for each segment there is a corresponding value in the CS register (which defines the start (base) address of the segment, the privilege level, and the limit, or size, of the segment, such that the entire segment in memory is linear and is uninterrupted in terms of its addresses). Code/data offset is added to the segment base address, and this sum is the linear address.

Next, if paging translation is enabled, linear address is translated to physical address. Linear address is passed through paging structures to get physical address. To start translation, there is pointer register to the, topmost paging structure. In Intel architecture, the pointer is stored in a register called CR3.

Paging structures resemble a tree. The topmost layer is pointed to by CR3. The topmost layer paging structure consists of a pointer set to lower layer paging structures, and so on. To go through paging structures, linear address is separated into several parts, usually by bit masks (e.g., see FIGS. 2B and 2C). Each bit sequence is responsible for a corresponding layer index to get a pointer to the lower layer. Usually the highest bits of linear address are responsible for topmost layer paging structure index, and lowest bits—for the offset on the physical page.

Other processor families have similar schemes.

From one point of view, the virtualization system prefers not to emulate linear space access from the guest OS due to performance issues. Therefore, the virtualization system can map corresponding guest pages to paging structures where it executes guest OS code. In this case, the guest OS will use translate guest linear address to physical address by a real CPU. The present invention, in one aspect, addresses how to cache such mapping.

From another point of view, the guest OS places page mapping in their paging structures by using guest physical addresses. Guest physical address does not correspond to real address, and usually the virtualization system has some sort of a guest to real physical address translation mechanism. Therefore, guest linear address translation can be real paging. This is another reason to have guest pages' mapping in alternative paging structures, different from the guest paging structures.

FIG. 1 illustrates, in schematic form, how paging structures are mapped from the guest OS to the VMM. In the discussion below, it will be assumed that the reader is generally familiar with the concepts of mapping. Also, the Intel architecture is used as an example, although the invention is not limited to Intel architecture.

As shown in FIG. 1 on the right, the guest operating system maintains several structures for converting a linear address (in other words, the address specified in an instruction, such as instruction MOV [XXX], YYY, with XXX being the linear address), to a physical address that the processor actually uses to address a cell in memory. The convert the linear address to physical address, control register 3 (CR3) points to a location in memory where the page directory is stored. The page directory is a set of pointers, each of which points to a particular page table. The entries in the page directory are called PDEs, or page directory entries, and the entries in the page table are called PTEs, or page table entries. The entry in the page table (PTE) then points to the particular page, which contains the code or data. Thus, the process of addressing a particular location in memory has four stages—1) find the location of the page directory using CR3, 2) find the appropriate page table using the PDE, 3) find the pointer (PTE) in the page table to the page containing the code/data, and 4) find the memory cell being addressed.

In a virtualized system that is running a guest operating system, pages that the guest operating system believes are in memory are not necessarily present in paging structures (i.e., in linear space), although this must be transparent to the guest operating system. Therefore, a relatively complex process needs to take place that maps the guest OS paging structures to the VMM paging structures. As a practical matter, the VMMs should map a page only if that page is actually being used by the guest operating system—those pages that are not used, or have not been used for some period of time, are usually swapped out of memory, to make room for other pages—this is particularly true of systems where one VMM is managing several Virtual Machines.

Thus, again with reference to FIG. 1, the guest CR3 points to the guest page directory, and the guest PDEs point to the guest PTEs, however, there is no guarantee that the pages to which the guest paging structures point are present in linear space—the VMM is responsible for making sure that an attempt by the guest OS to access a not-present page would trigger a page fault. Upon the triggering of the page fault, a handler in the VMM makes sure that the appropriate page is loaded into memory, that the VMM's paging structures that reflect the physically present guest OSs pages are updated, and execution of the instruction that caused the page fault then resumes, now that the guest page is in present paging structures and can be addressed by the guest OS.

It should be noted that the real processor uses the "real" CR3, not the guest CR3, to address memory, and the real CR3 points to the VMM's page directory, not to the guest page directory. The VMM's paging structures reflect which pages are "actually" in memory, which ones are not, and various other associated information, that enables the VMM to handle page faults.

With further reference to FIG. 1, a virtualized system would normally include a Virtual Machine running a guest operating system, and a Virtual Machine Monitor whose responsibility is to insure that the guest operating system's paging structures are properly virtualized. Consider the processing of an instruction MOV [XXX], YYY. This instruction copies the value YYY to the linear address XXX. The address XXX is not a real physical address, rather, it is a linear address that is derived by combining the value in one of the segment registers (by default, the data segment register, or DS) with the offset address XXX, to result in the linear address. Linear addresses is how the guest operating system accesses memory.

However, linear addresses bear no relation to real physical addresses that the processor actually uses to manipulate data in real physical memory. To actually access the real physical memory cell that corresponds to the linear address DS.Base+ XXX, the processor, in the standard addressing mode, utilizes the page directory/page table structures, discussed earlier. In the standard paging mode, the control register CR3 points to a location in memory where the page directory is stored. The page directory is a set of pointers, usually 1024 pointers, each of which points to the location of a page table.

Thus, with the linear address converted to physical address, through the sequence CR3—VMM page directory—VMM page table—physical page (which is 4 kilobytes in size), the instruction can now be executed.

One additional complication of modern operating systems is that typically a number of processes are being simultaneously managed by the operating system. Each such process typically has its own address space, and each such process usually has its own page directory, its own set of page tables, and possibly its own area of physical memory (in other words, its own set of physical pages). The operating system switches between the processes by changing the value of the control register CR3—by having the control register CR3 point to a different page directory (with its different set of page tables and therefore different pages), the operating system can switch the context between the various processes.

Page faults are a very common occurrence in Virtual Machine technology, and are highly overhead-intensive. Therefore, the question of how to handle page faults efficiently, minimizing the overhead associated with each page fault and minimizing the number of such page faults, directly impacts the performance of the Virtual Machine. Again with reference to FIG. 1, the guest operating system on the right half of the figure has a page directory, referred to as a "guest page directory," to which the guest control register CR3 points. In the guest page directories, for those pages that the guest operating system thinks are present in the linear space, there is a corresponding entry in the guest page table, which points to the page. This structure needs to be mapped to the VMM paging, which represents correct mapping to guest pages for the guest operating system.

As shown on the left half of FIG. 1, the Virtual Machine Monitor has paging structures, to which the guest paging structures are mapped. However, simply copying the paging structures and working with then directly would be extremely inefficient. In fact, as may be seen in FIG. 1, there are a number of paging structures, Also, two additional structures are shown in FIG. 1—a CR3 cache 110, and linking structures 414, also discussed with reference to FIG. 4, referred to as "tie descriptors." The CR3 cache 110 is essentially a small database of cached paging translations for various values of the control register CR3, such that each value points to a different page directory of the VMM. When the guest operating system switches context between two processes by loading a different value into the control register CR3, the VMM can do the same, such that the "real" CR3, instead of pointing to the top page director ($CR3_1$), can point to the page directory on the bottom of FIG. 1 ($CR3_2$). In essence, the switching of the context within the guest operating system can be mirrored by the switching of the context within the VMM. The CR3 cache 110 is used for storing sub-caches for different values of CR3. When guest OS switches to another CR3 value, the VMM switches to an additional higher layer for caching multiply sets of paging caches and corresponding real paging structure set instead of whole paging cache reset.

More complex criteria (or conditions) for choosing a sub-cache branch for current guest OS working mode can be used in the cache 110, rather than simple value of control register. For example, complex criteria can be used within guest OS paging schemes, where new guest paging structures are from copied from another set.

Also, it is worth noting that when a page fault occurs, the address that caused the page fault is loaded into the control register CR2, which allows using the control register CR2 as an index into the CR3 cache 110. Also of note is that PDEs from different page directories can point to the same page table, as illustrated in FIG. 1. Furthermore, it should be remembered that the VMM operates on the same rules as the guest operating system, as far as the addressing scheme is concerned. In other words, the PDEs and the PTEs in the VMM's page directories and page tables represent real physical addresses, however, there are no instructions in the Intel instruction set that utilize real physical addresses—therefore, the VMM needs to use linear (and offset) addresses when manipulating its page directories and its page tables. In order to enable this process to occur efficiently, linking structures, such as tie descriptors 414 need to be utilized, as discussed further below.

When an instruction in the Virtual Machine attempts to access a page whose Present bit is set to 0 (i.e., the page is not present in linear space), a page fault is triggered, and a VMM page fault handler is invoked. The page fault handler's job is therefore to load the page into physical memory, to map the page into the VMM's paging structures, and then restart the execution of the instruction that caused the page fault, such that the guest OS would not realize that a page fault had occurred. Part of the VMM page fault handler's job is to map the PDE and the PTE properly, in other words, load the proper PDE value into the appropriate page directory, and load the proper PTE value into the appropriate page table. In one possible embodiment, the VMM creates alternative page directories and page tables for real mapping. Furthermore, the linking structures 414 need to be updated, to ensure that the page fault handler does its job efficiently, as will also be discussed below. Also, the paging cache 110 needs to be updated, and the CR3 register needs to be loaded with an address that points to the appropriate page directory.

A mirror process needs to take place when a page that is currently in linear space needs to be swapped out for a different page. In that case, the page's present bit needs to be set to zero, and all the pointers in the paging structure that point to that page need to be reset. Since the guest OS is unaware that a page that it believes is in linear mapping has been swapped out, it is the paging structures in the VMM (not in the guest OS) that needs to be synchronized with that event. The appropriate page table entries need to be set to zero, the appropriate page directory entries needs to be set to zero, if necessary, etc.

As noted earlier, the same page can be pointed to by different page tables, similar to the same page table being pointed to by different page directories. All of these need to be updated to reflect the fact that the "real" page is no longer in linear mapping. In the absence of some optimization, this would be a relatively time consuming process—e.g., all the entries in the appropriate page table would need to be searched, to see if it points to the swapped-out page—in the case of a page table with 1024 entries, this would require checking 1024 entries. Similarly, when updating the page directory, every PDE in the page directory needs to be checked, for a total of 1024 PDEs. As is clear from this example, this is a time consuming process, which, when repeated thousands or hundreds of thousands of times per second, as is the case with Intel processors and Virtual Machine technology in 2006, has a severe impact on the performance of the Virtual Machine. Accordingly, the linking structures 414 are also used to quickly identify which PTEs and PDEs relate to the swapped out page, zeroing them out quickly and efficiently. This will be discussed further below with reference to FIG. 4.

At this point it is worthwhile to address the circumstances when a page is swapped in and out of physical memory by the VMM. As noted earlier, the amount of physical memory allocated to each Virtual Machine (and its corresponding guest OS) is usually a fraction of the physical memory that is available on the physical computer, and is typically less than the Virtual Machine thinks it has allocated to it by the hardware. Therefore, the situation of having to swap a page in and out of memory is a frequent occurrence. Any number of algorithms can be used to determine which page (of the pages that are physically currently in memory) should be as swapped out, to be replaced by the page that whose attempted access triggered the page fault. One such algorithm is last-used-first-out. Here, the page that has not been accessed in the longest amount of time becomes the most likely candidate for being "tossed out." Other, more sophisticated algorithms can be used, however, empirical experience (or, at least, the experience of the inventors) shows that the predictive abilities of most such algorithms are fairly limited, and might not show any visible and/or significant improvement over the last-used-first-out approach. In theory, a good predictive algorithm might obviate the need for optimization of the handling of page faults, in practice, however, this problem has thus far defied a predictive solution.

Figure 2A:
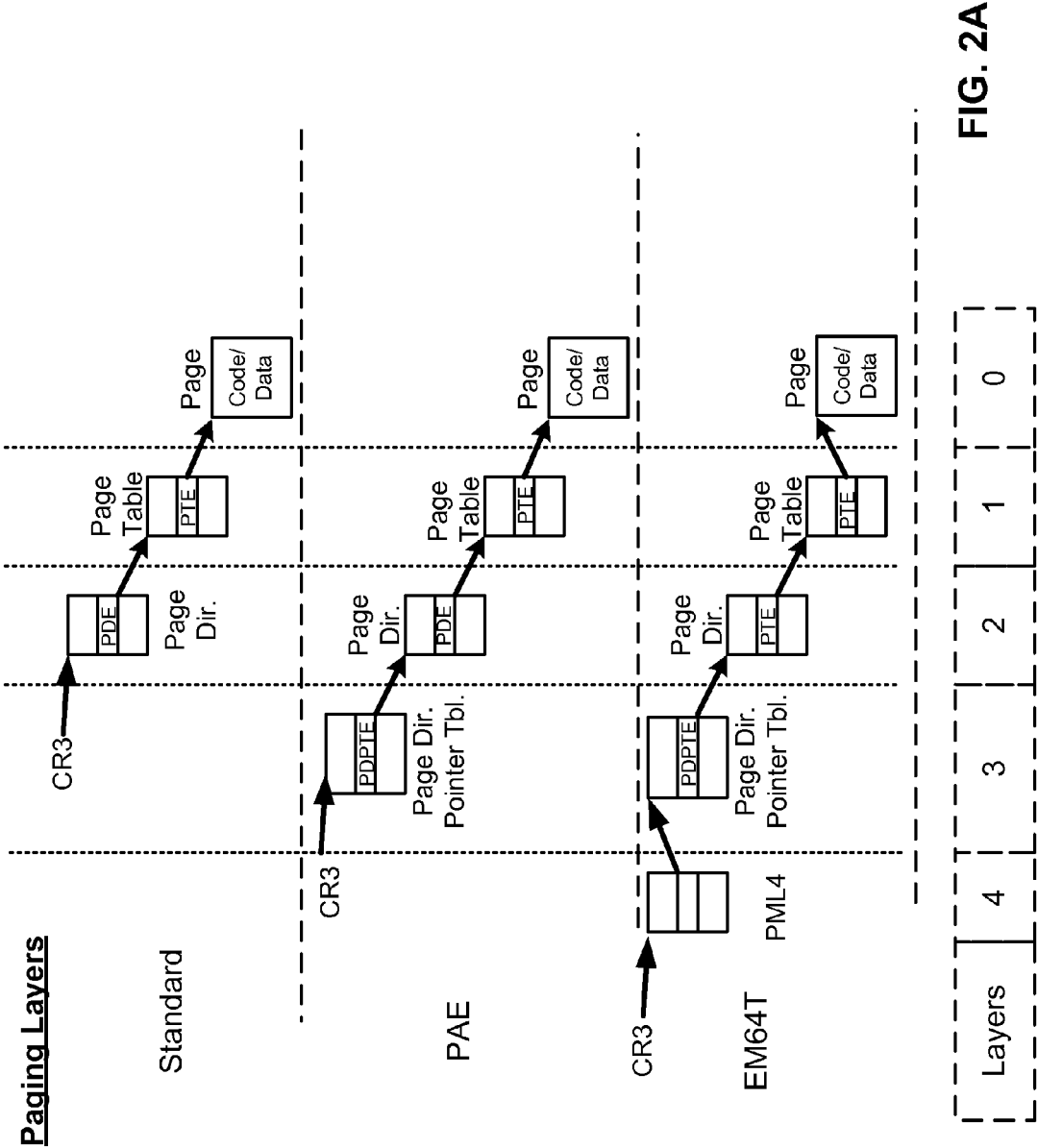
Figure 2B:
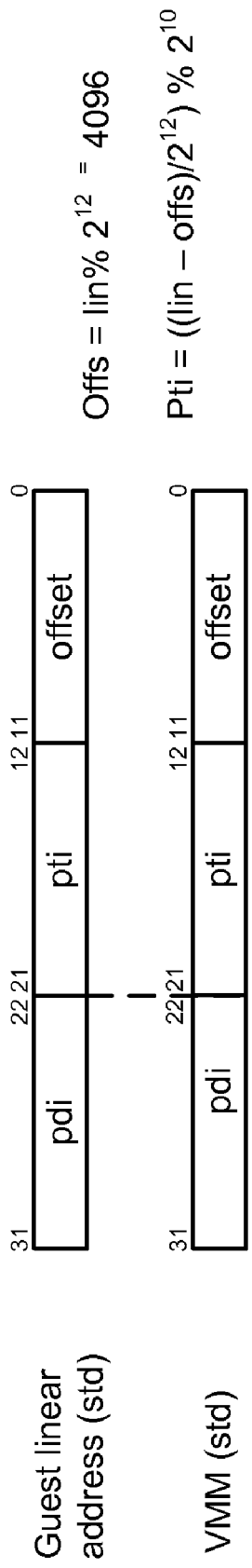

FIG. 2A illustrates the concept of layers as it relates to the Intel architecture and the present invention. As shown in FIG. 2A, the simplest mode of addressing, in the Intel architecture, is referred to as the "standard" mode, and uses 32 bit addresses. In this case, the 32 bit linear address is converted to a 32 bit physical address using the values in one of the segment registers (code segments CS, data segment DS, etc.) and the 32 bit offset. The 32 bit linear address that is thus formed is then translated into a physical address by the processor using a page directory and a page table, which are both in physical memory. With reference to FIG. 2B, the 32 bit address of the standard mode can be viewed as having a 12 bit offset within a page, a 10 bit index into the page table (called "pti", or page table index), and a 10 bit index into the page directory (called pdi, or page directory index). This is the linear address that is converted to the physical address. In the physical address extension (PAE) addressing mode, see FIG. 2C the address can be 36 bits. To store wide physical addresses in paging structures, their entries have to be wider than 32 bits. In this case Intel make them 64 bit. Therefore, any paging structure in PAE mode has 512 entries (not 1024, as in standard one). Linear address width remains the same and is equal to 32 bits, but the address structure shown in the top half of FIG. 2C is changed to structure shown in the bottom of FIG. 2C using masking. Also, an additional structure, called page directory pointer table, or PDPT, was added and is used, essentially in the same manner as in a standard addressing scheme (but as an additional "layer"). The PDPT layer, in the context of the present discussion, is referred to as layer 3. FIG. 2C shows how linear address masks in guest standard paging mode are mapped to the VMM's PAE mode linear address masks.

The EM64T addressing mode uses 48 bit linear addresses, and uses an additional structure, called PML4, which functions analogously to the lower layer structures—with the CR3 pointing to the PML4, an entry in the PML4 table pointing to the PDPT, etc.

As the reader will appreciate, the addressing scheme of the Intel architecture has consequences for how the VMM can function. If the guest OS is a 32 bit operating system (in other words, that uses only standard addressing scheme), then the VMM can also remain in the standard addressing mode.

However, the VMM can also use the PAE mode, or the EM64T mode. If the guest OS uses a PAE addressing mode, then the VMM must use either PAE mode, or the EM64T mode. If the guest OS uses EM64T addressing mode, then the VMM must use EM64T as well. In sum, the addressing mode of the VMM should be "no lower" than the addressing mode of the guest OS.

Figure 3:
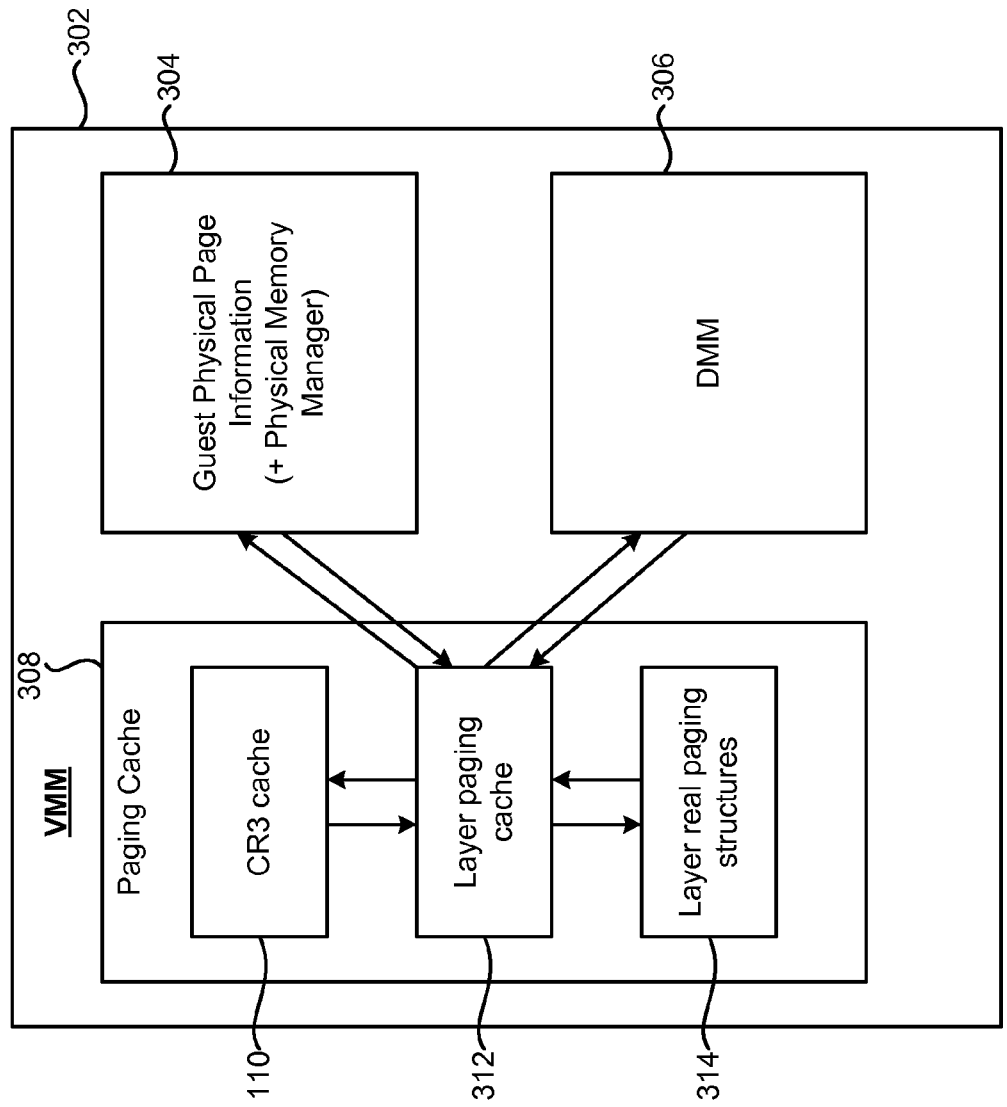
FIG. 3 illustrates a high-level relationship between the paging cache of the VMM and other VMM subsystems.

With the above discussion of FIG. 1 and the associated processes of swapping pages in and out of memory (and corresponding updating of the paging structures) in mind, FIG. 3 illustrates an overall high-level architecture of the paging cache approach described herein. As shown in FIG. 3, the VMM 302 has a number of elements that are relevant to the present discussion (as will be understood by one of ordinary skill in the art, the VMM can have a number of other elements and subsystems, and the complexity of some Virtual Machines can rival the complexity of an operating system—however, those aspects are generally outside the scope of the present discussion). As shown in FIG. 3, the paging cache 308 of the VMM 302 includes at least three elements—the CR3 cache 110, the layer paging cache 312, and the layer real paging structures 314. The CR3 cache 110, as discussed earlier, is a structure that keeps track of the guest CR3 used by the various guest operating systems, and the various corresponding processes within those guest operating systems. The entries in the CR3 cache 110, each of which corresponds to a (usually) distinct guest CR3, point to the particular VMM page directory associated with that guest process. The change of the context by the guest operating system, which involves changing the CR3 in the guest operating system to point to a different guest page directory, triggers an associated change of the "real" CR3 in the VMM, such that the CR3 of the VMM will point to a different paging structure (page directory and page table), thereby effecting a context switch, before the execution of the guest code resumes.

The paging cache 308 also includes the layer paging cache 312. Each layer in the paging structure has its own associated tables and linking structures, which generally work in a similar manner from layer to layer. For example, in the standard addressing mode, there are three layers—the pages themselves (zero layer), the page tables (layer 1), and the page directories (layer 2). Other addressing modes, such as PAE (physical address extension), which allows handling a much larger physical address space, using 36 bit addresses, or the EM64T mode, which operates with 56 bit addresses, have layer three (page directory page table, or PDPT, in the case of PAE), and layer four in the case of EM64T, which uses PML4 tables. The paging cache 112 includes the connecting elements (tie descriptors) 414, lists of mapped elements (in other words, those elements in the next layer that are present in the cache), and backlinks to the "layer above," as will be discussed further with reference to FIG. 4.

The real paging structures 314 of each layer, include real tables and entries that fully describe mapping of corresponding layer.

For example, if both the guest OS and the VMM work in the same paging mode (see FIG. 4), paging structures differ and linear address mask to determine entries indexes in paging structures (see FIG. 2B) are the same. In this case, to map a guest page table into VMM paging, the VMM represents it by corresponding single page tables (one-to-one relationship).

As another example, if the guest OS works in standard paging mode, the VMM is in PAE mode (see FIG. 5), the format of paging structures differs: the guest page table has 1024 4-byte-long entriess, the VMM page table has 512 8-byte-longentries. Linear address masks to determine entries indices in paging structures also differ (see FIG. 2C).

In this case, to map a guest page table into VMM paging, the VMM represents each guest page table as two real page tables. Therefore, two PDEs from the VMM's page directories point to these two real page tables. Guest page directory is mapped by one real page directory, one page table and four page directories.

FIG. 3 shows one possible subsystem hierarchy involved in paging cache maintenance. It includes two auxiliary subsystems: guest physical memory information tracker with Physical Memory Manager 304, DMM 306.

Various structures in mechanisms used for physical memory management is discussed in co-pending application Ser. No. 11/558,498; Filed: Nov. 10, 2006, entitled EXPANSION OF VIRTUALIZED PHYSICAL MEMORY OF VIRTUAL MACHINE, which is incorporated by reference in its entirety. In essence, element 304 is responsible for translation guest physical addresses to real addresses and for maintaining virtualization of guest physical memory.

Also shown in FIG. 3 is the dynamic memory manager 306, which is the sub-system that is responsible for centralizing allocating and deallocating memory buffers and pages in the VMM for different subsystems included in the paging cache.

The sub-systems of 314 is where the real CR3 (i.e., the CR3 of the VMM) points to during guest code execution, to virtualize guest linear space. Sub-systems of 314 are responsible for maintaining real paging structures to form correct paging model for execution guest code.

The layer paging cache 312 is, in essence, a representation of which guest OS pages are mapped, which pages are not mapped, and associated structures for optimizing search and synchronization between the mapped paths, the not-mapped paths, and for general tracking of mapped pages.

Figure 4:
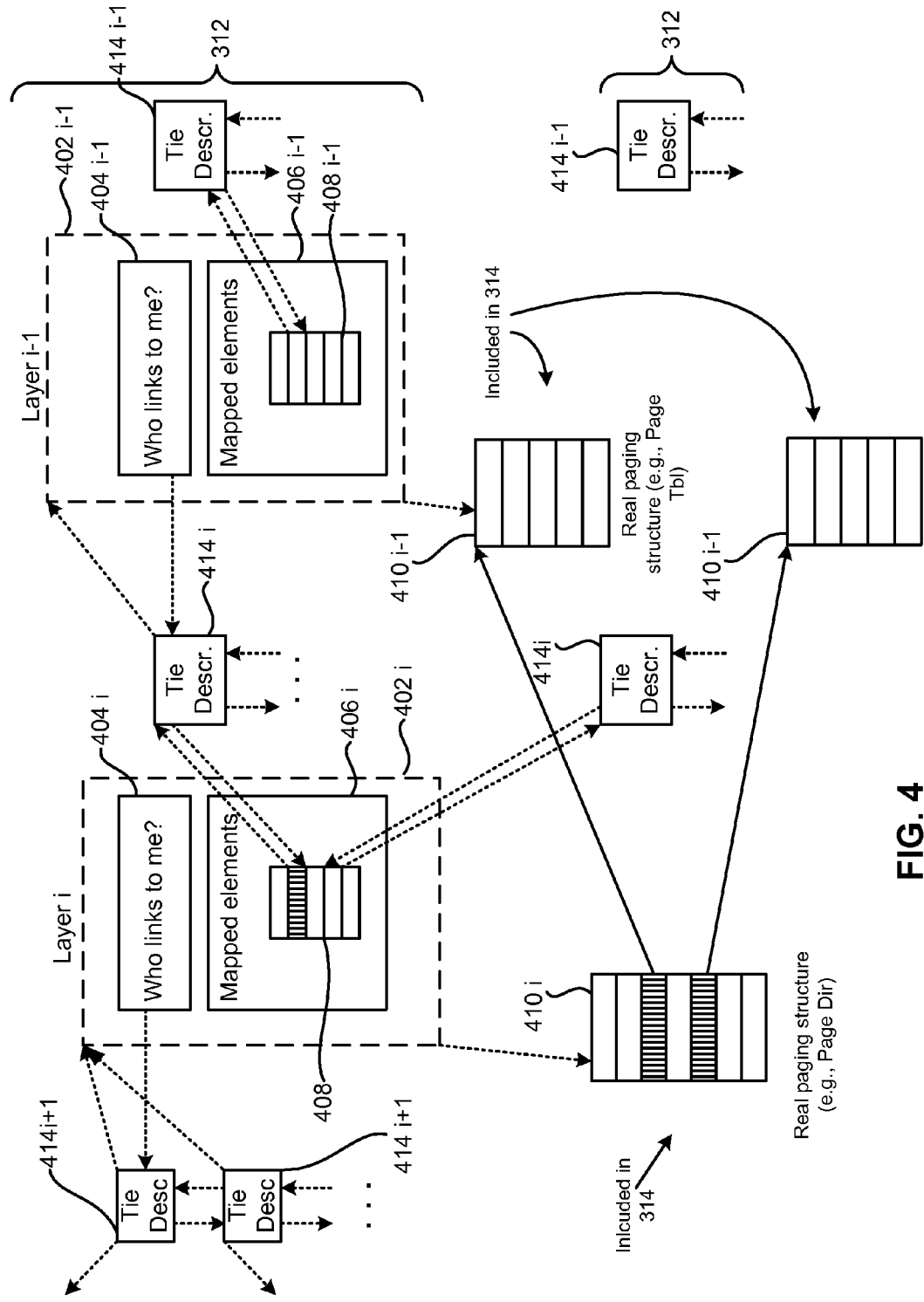
FIG. 4 illustrates the caching of paging structures when the VMM paging mode is the same as the guest paging mode, for the standard paging addressing mode of the Intel architecture.

FIG. 4 illustrates in more detail the relationship between the various elements of the layer paging cache 312 and the real paging structures 314. Starting with the real paging structures 314, in the case of layers 1 and 2, where in FIG. 4 "i" refers to layer 2, which contains the page directories, and "i–1" refers to layer 1, which contains the page tables, the figure shows a real paging structure 410i, which in this case is a page directory that contains real physical addresses pointing to page tables (in this case, two page tables are shown, labeled 410i–1). The elements 410i–1 also contains real physical addresses, in this case, real physical addresses of real pages in real physical memory. In other words, with the VMM's CR3 pointing to 410i, a linear address can be translated by the processor into a physical address, in order to access a cell in memory.

Further with reference to FIG. 4, the use of the tie descriptors 414 is illustrated. As noted earlier, the code of the VMM has to use the same addressing scheme as any other code—there are no instructions that use physical addresses, only linear addresses. Thus, linking structures (tie descriptors) 414 are used to keep track of which pages have been mapped, and which ones have not. Specifically, considering the tie descriptors 414i, the tie descriptor has a pointer to the structure 406i, which contains a list of all the mapped elements of this layer (see 408). Note that of all the possible entries in, for example, the page directory, only a small fraction of the 1024 possible entries might actually be mapped—in many practical cases, this number could be as few as one or two, or a few dozen—illustrating the inefficiency of a brute force approach to checking the page directory directly for which pages and page tables have been mapped, and which ones have not.

The mapped elements 408 contain pointers to those entries in the page directory that represent mapped pages—thus, the number of the mapped elements 408 equals the numbers of entries in a page directory that corresponds to the page tables that are actually used. Element 404*i* represent a backlink to tie descriptors on the next layer "above." Also note that the tie descriptor 414 has links to and from at least one other tie descriptor on the same level (assuming, of course, there is at least one other one). Thus, when an element on the next lower layer is removed (for example, a page is swapped out or a page table is no longer used), by referring to the tie descriptor 414*i* (through the "who links to me?") element 404*i*–1, it is easy to identify only those elements on this layer that refer to the swapped out element. For example, if two different page directory entries (PDEs) from two different page directories point to the same page table, using the tie descriptors 414*i*, they can be quickly identified and zeroed out.

Figure 5:
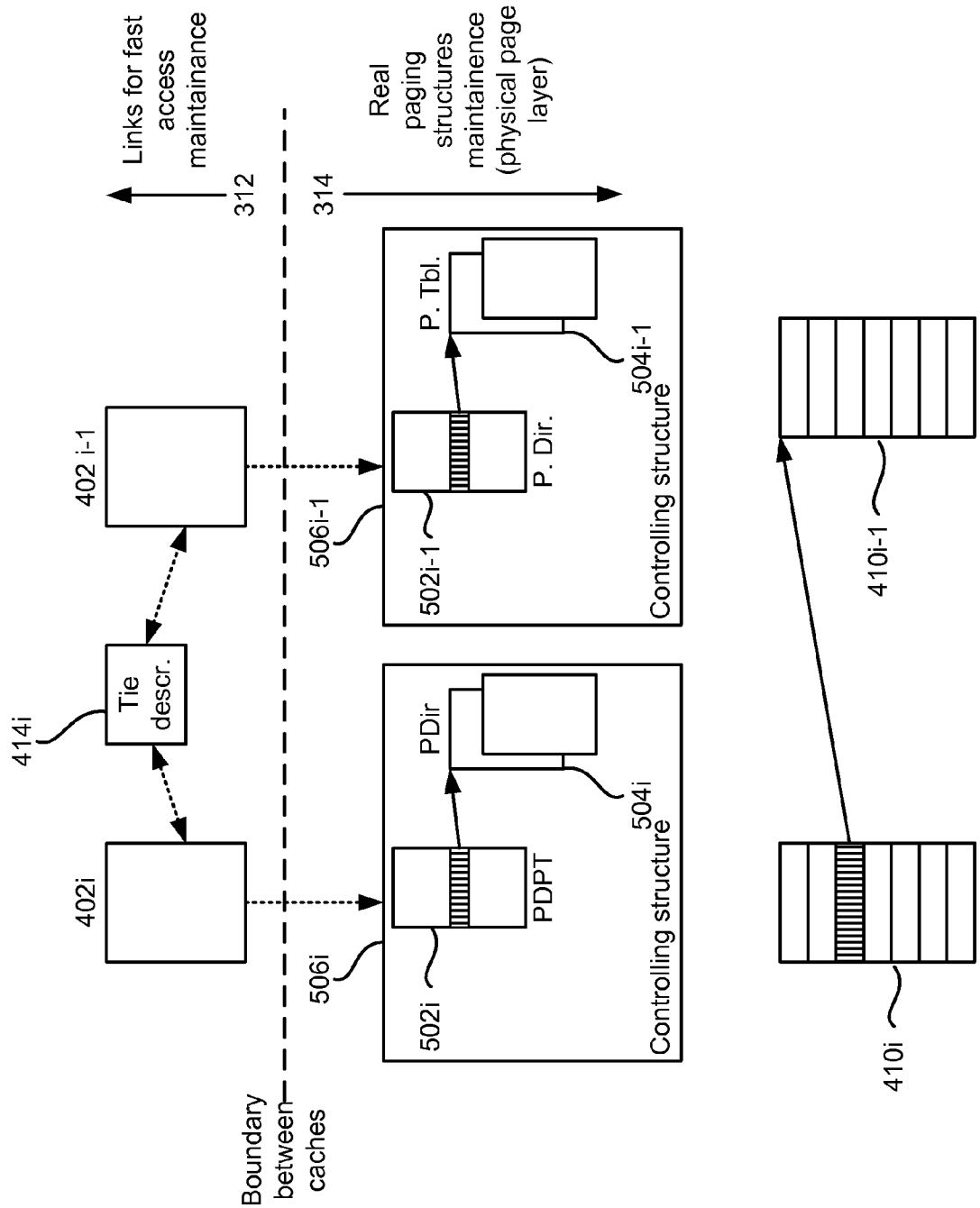
FIG. 5 illustrates the caching of paging structures when VMM paging mode differs from the guest paging mode, for the PAE/EM64T paging addressing mode of the Intel architecture in the VMM and standard paging mode in the guest OS.

VMM can use another paging model to virtualize guest OS which uses another model. For example, FIG. 2C shows that guest OS works in a standard paging model. The VMM works in the PAE mode. FIG. 5 shows how the VMM organizes paging cache in this case. Linear addresses masks here are also different due to the fact that the format of the paging structures is different. In this case, the number of paging structure entries is differed: there are 1024 entries in standard mode and 512 entries in PAE mode. To translate one kind of paging to another one, the VMM needs to organize paging structures in the proper manner. To do this, the VMM organizes paging cache in terms of guest OS paging model. In other words, the nodes of paging cache are descriptors of guest OS paging structures and real paging structures 410 (represented by elements illustrated on 506) are linked to guest paging structure descriptor 402.

As another example, if the guest OS works in the standard paging mode, the VMM is in PAE mode (see FIG. 5), the format of paging structures differs: guest page table has 1024 4-byte-long entries, and the VMM page table has 512 8-byte-long entries. Linear address masks to determine entries indexes in paging structures also differ (see FIG. 2C). In this case, to map the guest page table into VMM paging, the VMM represents each guest page table as two real page tables. Therefore, two PDEs from the VMM page directories point to these two real page tables. The guest page directory is mapped by using one real page directory page table and four page directories.

Figure 6:
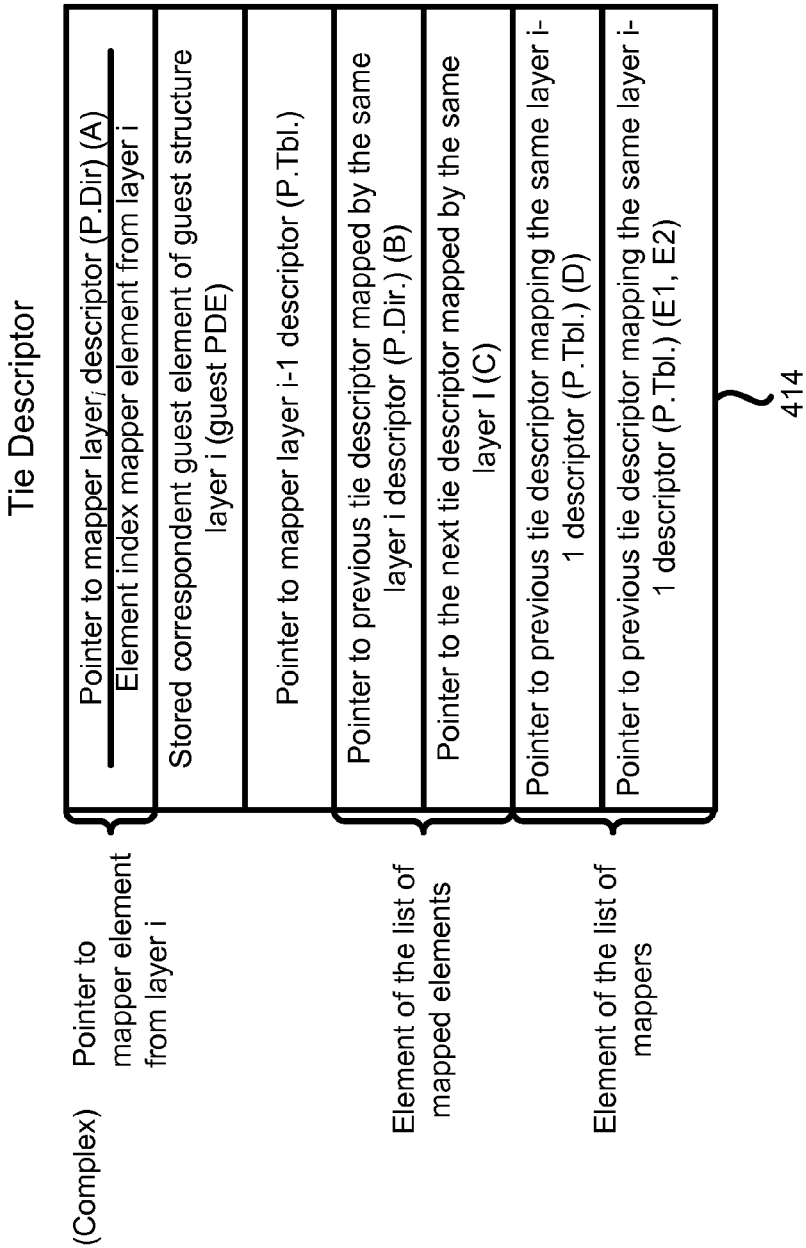
FIG. 6 illustrates one implementation of a tie descriptor.
Figure 7:
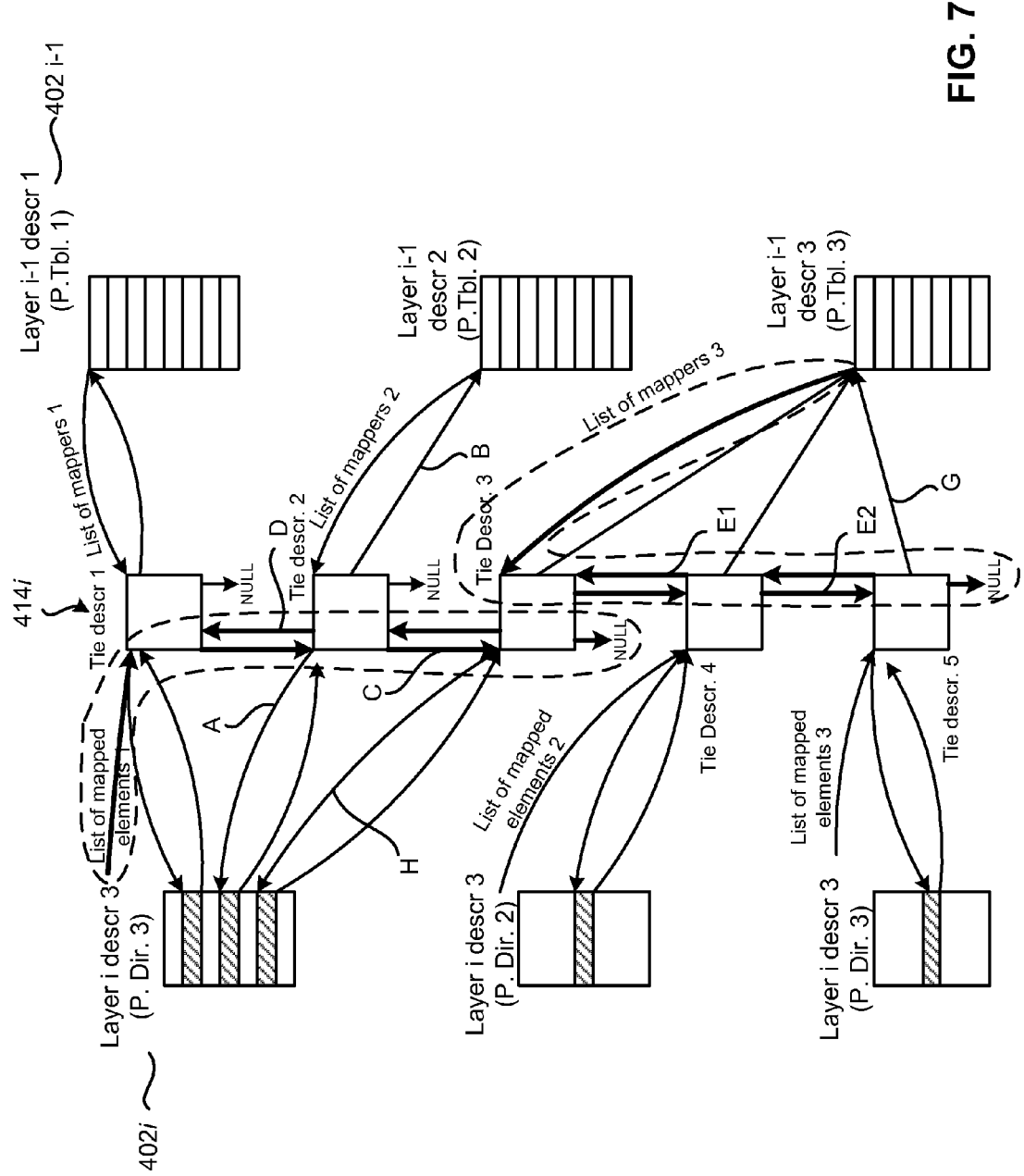
FIG. 7 illustrates additional detail of how tie descriptors are used.
Figure 8:
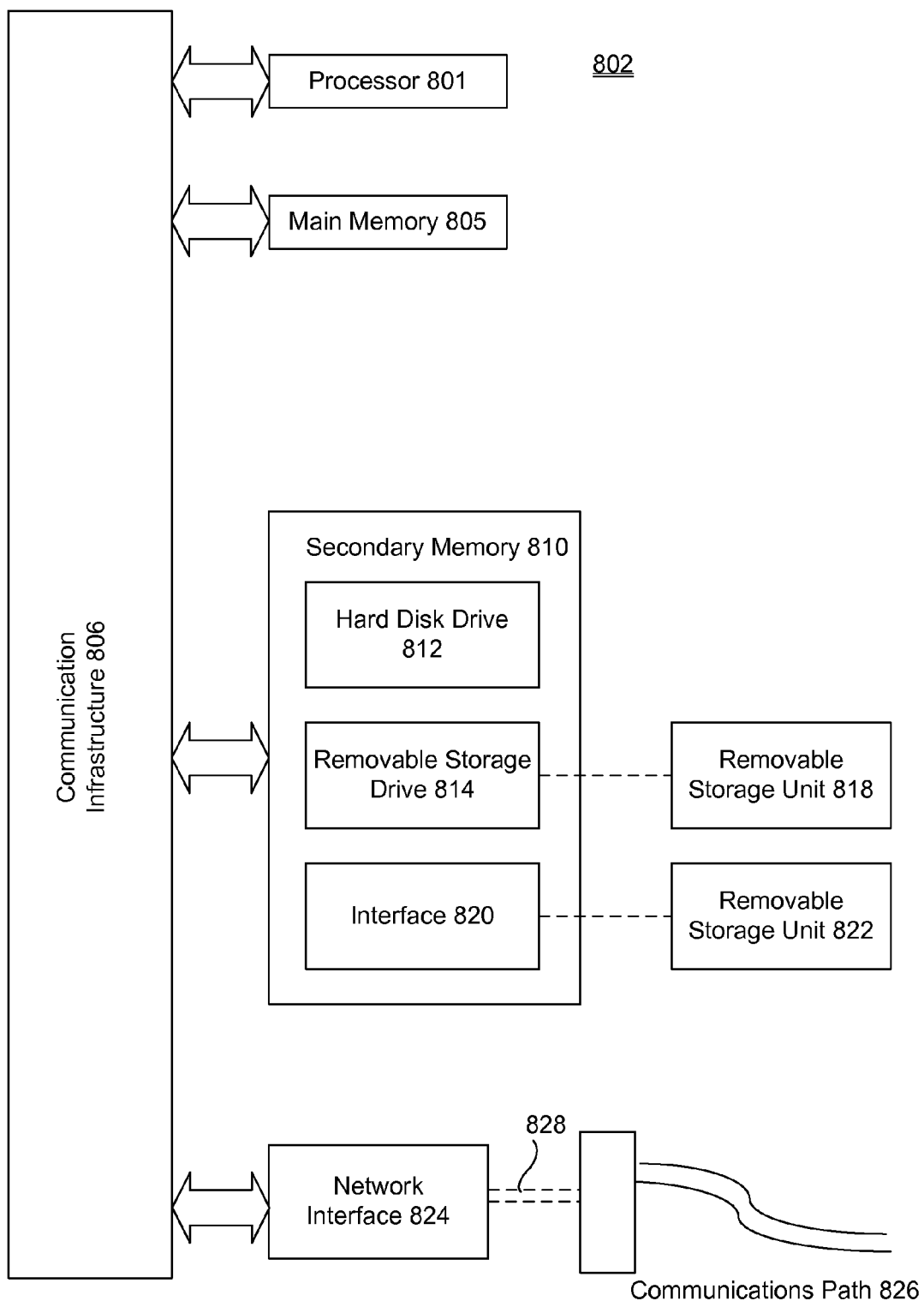
FIG. 8 illustrates an example of a computer system where the corresponding paging caching technology described herein can be implemented.

FIGS. 6 and 7 illustrate in additional detail how the tie descriptors 414 work. FIG. 6 illustrates the fields that a typical tie descriptor 414 can have, and FIG. 7 illustrates how these fields correspond to pointers to the various elements of the structure described earlier. As shown in FIGS. 6 and 7, the first field is a pointer to mapper layer i descriptor (in this case, to the page directory). For tie descriptor 2, this pointer is designated by A in FIG. 7.

The next field is the element index of the mapper element from layer i (in other words, the number of the entry in the page directory, see the hatched element in the structure 408 in FIG. 4, and the arrow G in FIG. 7).

The next field is the stored corresponding guest element of the guest structure of the layer i (in other words, of the guest PDE). This contains information about the guest PDE, such as permissions, privilege levels, etc., (essentially, as an optional performance optimization to avoid excessive accessing of the guest paging structures in the guest memory) which the VMM can access without having to go into the guest code pages themselves.

The next field is a pointer to mapper layer i descriptor (to the page table, see H on FIG. 7).

The next field is a pointer to the previous tie descriptor that is not in the same layer i descriptor, in other words, analogous to the guest code pointer from the page directory to the page table. In this case, with tie descriptor 2, this corresponds to the arrow B in FIG. 7.

The next field is a pointer to the next tie descriptor (tie descriptor 3) that is mapped in the same layer, in other words, in this case, this corresponds to the arrow labeled C, that points to tie descriptor 3.

The next field is a pointer to the previous tie descriptor that maps the same layer i–1 descriptor (in other words, mapped the same page table). This corresponds to the arrow labeled D in the FIG. 7.

The next field is a pointer to the next tie descriptor (tie descriptor 1) that maps the same layer i–1 descriptor. In this case, using the examples of tie descriptors 3, 4 and 5, this corresponds to the arrows labeled E1 and E2.

These can be used more efficiently to delete paging structure, such as page directories and page tables, for example, to free up space explicitly or because at some point at time a particular structure becomes empty.

Note that if the same guest physical page performs two (or more) roles in guest paging translation (e.g., it acts as page directory and page table in the same time), then the VMM creates separate paging structure descriptors in the cache to represent valid mapping paths going through these structures.

One of the aspects that the VMM designer needs to decide on is which addressing mode the VMM itself would use. One option, if the guest OS is 32 bit OS, standard mode can be used for the VMM as well. If some of the guest OS's are 32 bit OS's, and others use PAE or EM64T addressing modes, then one option possibility is to use separate VMMs for the different addressing modes, with one VMM supervising the standard addressing mode OS, the other VMM supervising the PAE addressing mode OS, etc. Another option is to use a "universal" VMM, which uses the highest addressing mode, such as EM64T. This has significance for how the tie descriptors are structured, and the size of the tie descriptors.

In the 32 bit OS case, if the VMM is also 32 bits, the tie descriptors who would be 32 bits as well. In the PAE/EM64T mode, the tie descriptors would be 8 bytes wide. If a single VMM (for example, EM64T-based VMM) is used for supervising a 32 bit guest OS, one option is to use only the least significant 4 bytes of and 8 byte tie descriptor, ignoring the most significant 4 bytes. Another option is to use the full 8 byte addressing for the tie descriptors/pointers.

An example of the computer 602 on which the neural network can be implemented is illustrated in FIG. 6. The computer 602 includes one or more processors, such as processor 601. The processor 601 is connected to a communication infrastructure 606, such as a bus or network). Various software implementations are described in terms of this exemplary computer system. After reading this description, it will become apparent to a person skilled in the relevant art how to implement the invention using other computer systems and/or computer architectures.

Computer 602 also includes a main memory 608, preferably random access memory (RAM), and may also include a secondary memory 610. The secondary memory 610 may include, for example, a hard disk drive 612 and/or a removable storage drive 614, representing a magnetic tape drive, an optical disk drive, etc. The removable storage drive 614 reads from and/or writes to a removable storage unit 618 in a well known manner. Removable storage unit 618 represents a magnetic tape, optical disk, or other storage medium that is read by and written to by removable storage drive 614. As will be appreciated, the removable storage unit 618 can include a computer usable storage medium having stored therein computer software and/or data.

In alternative implementations, secondary memory 610 may include other means for allowing computer programs or other instructions to be loaded into computer 602. Such means may include, for example, a removable storage unit 622 and an interface 620. An example of such means may include a removable memory chip (such as an EPROM, or PROM) and associated socket, or other removable storage units 622 and interfaces 620 which allow software and data to be transferred from the removable storage unit 622 to computer 602.

Computer 602 may also include one or more communications interfaces, such as communications interface 624. Communications interface 624 allows software and data to be transferred between computer 602 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, an RF link and other communications channels. In an embodiment of the invention, signals 628 comprise data packets sent to processor 601. Information representing processed packets can also be sent in the form of signals 628 from processor 601 through communications path 626.

The terms "computer program medium" and "computer usable medium" are used to generally refer to media such as removable storage units 618 and 622, a hard disk installed in hard disk drive 612, and signals 628, which provide software to the computer 602.

Computer programs are stored in main memory 608 and/or secondary memory 610. Computer programs may also be received via communications interface 624. Such computer programs, when executed, enable the computer 602 to implement the present invention as discussed herein. In particular, the computer programs, when executed, enable the processor 601 to implement the present invention. Where the invention is implemented using software, the software may be stored in a computer program product and loaded into computer 602 using removable storage drive 614, hard drive 612 or communications interface 624.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for virtualizing a processor, comprising:
   a virtualization system running on a computer system and maintaining real paging structures;
   a Virtual Machine (VM) having at least one set of guest paging structures that correspond to guest pages in a virtualized linear address space;
   for each guest page that is mapped to the real paging structures, means for handling a connection structure between the guest page and a real physical address of the guest page;
   a set of cached paths to the real paging structures, each path being described by guest paging structure descriptors and by tie descriptors; and
   each path comprising a plurality of nodes connected by the tie descriptors,
   wherein each guest paging structure descriptor is in a node of at least one path,
   wherein each guest paging structure either points to other guest paging structures or to guest pages, and
   wherein each guest paging structure descriptor is used to map guest pages to the real paging structures.

2. The system of claim 1, wherein the guest paging structures and the real paging structures are organized into a hierarchy of layers.

3. The system of claim 2, further comprising an additional layer that utilizes a CR3 cache for caching of paging translations for different values of CR3.

4. The system of claim 3, wherein additional layers of the caching structure are added to describe different guest OS code working modes.

5. The system of claim 4, wherein guest OS code working modes includes paged and non-paged modes.

6. The system of claim 4, wherein each guest paging structure descriptor maintains links to at least one real paging structure to organize guest page mapping to the real paging structures.

7. The system of claim 6, wherein guest OS paging mode and virtualization system paging mode are different.

8. The system of claim 2, wherein the layers comprise a zeroth layer with pages, a first layer with page tables, and a second layer with page directories.

9. The system of claim 2, wherein each layer has its own set of tie descriptors.

10. The system of claim 9, further comprising a third layer with page directory page tables, and a fourth layer with PML4 tables.

11. The system of claim 2, wherein the VM uses one of standard, PAE and EM64T addressing modes, and the VMM uses an addressing mode at least as high as the VM addressing mode.

12. The system of claim 2, further comprising an additional higher layer for caching of multiple sets of paging caches.

13. The system of claim 1, wherein the tie descriptors include pointers to other tie descriptors of the same layer.

14. The system of claim 1, wherein the tie descriptors include pointers to paging elements of the next layer below.

15. The system of claim 1, wherein the tie descriptors include pointers to paging elements of the next layer above.

16. A method for virtualizing a processor, comprising:
   initiating a virtualization system running on a computer system for maintaining real paging structures;
   launching a Virtual Machine (VM) running guest code and having at least one set of guest paging structures that correspond to guest pages in virtualized linear address space;
   for each guest page that is mapped to the real paging structures, activating means for handling a connection structure between the guest page and a real physical address of the guest page;
   generating a set of cached paths to the real paging structures, each path being described by guest paging structure descriptors and by tie descriptors, and each path comprising a plurality of nodes connected by the tie descriptors,
   wherein each guest paging structure descriptor is in a node of at least one path,
   wherein each guest paging structure either points to other guest paging structures or to guest pages, and wherein each guest paging structure descriptor is used for mapping guest pages to the real paging structures.

17. The method of claim 16, further comprising, when a physical page that is reflected in the guest paging structures is removed from mapping paths, using the tie descriptors to update the VMM paging structures.

18. The method of claim 16, further comprising, when a physical page that is reflected in the guest paging structures is added to paging structures, using the tie descriptors to update the VMM paging structures.

19. A computer useable storage medium having computer program logic stored thereon for executing on a processor for implementing the steps of claim 16.

* * * * *